(12) United States Patent
Suryanarayana et al.

(10) Patent No.: US 8,270,998 B2
(45) Date of Patent: Sep. 18, 2012

(54) LOCATION DETERMINATION USING HISTORICAL DATA

(75) Inventors: Lalitha Suryanarayana, Austin, TX (US); David Patron, Cedar Park, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 710 days.

(21) Appl. No.: 11/807,459

(22) Filed: May 29, 2007

(65) Prior Publication Data

US 2007/0232329 A1    Oct. 4, 2007

Related U.S. Application Data

(63) Continuation of application No. 10/369,147, filed on Feb. 18, 2003, now Pat. No. 7,242,950.

(51) Int. Cl.
*H04W 24/00* (2009.01)
(52) U.S. Cl. ............... 455/456.5; 455/456.1; 455/456.2; 455/436; 455/437; 455/457; 370/338

(58) Field of Classification Search .................. 370/338; 455/456.1, 456.2, 457, 552.1, 553.1, 436–442
See application file for complete search history.

(56) References Cited

U.S. PATENT DOCUMENTS

| | | | |
|---|---|---|---|
| 2002/0191573 A1* | 12/2002 | Whitehill et al. | 370/338 |
| 2004/0009748 A1* | 1/2004 | Heinonen et al. | 455/41.2 |
| 2004/0053613 A1* | 3/2004 | Karaoguz et al. | 455/436 |
| 2004/0057408 A1* | 3/2004 | Gray | 370/338 |
| 2004/0116120 A1* | 6/2004 | Gallagher et al. | 455/436 |
| 2006/0291455 A1* | 12/2006 | Katz et al. | 370/355 |

* cited by examiner

*Primary Examiner* — Dwayne Bost
*Assistant Examiner* — Edward Zhang
(74) *Attorney, Agent, or Firm* — Parks IP Law LLC; Mickki D. Murray, Esq.

(57) ABSTRACT

Systems and methods for determining a location based on historical data are disclosed. Generally, a location determination component receives a request for information from a wireless device, where the request is associated with at least two network access points (NAPs). The location determination component determines which of the at least two NAPs has a greater precedence and estimates a current location of the wireless device based on a known location of the current NAP and a known location of a previously-current NAP associated with the wireless device.

20 Claims, 4 Drawing Sheets

LOCATION DETERMINATION USING HISTORICAL DATA

RELATED APPLICATIONS

The present patent document is a continuation of U.S. patent application Ser. No. 10/369,147, filed Feb. 18, 2003, now U.S. Pat. No. 7,242,950, the entirety of which is hereby incorporated by reference.

BACKGROUND

1. Field of the Invention

The present invention relates to methods and systems for determining a location of a wireless network access device.

2. Description of the Related Art

Location determination in a local wireless network area may be carried out using a network-based method. A network-based method involves tagging location data to each of a plurality of network access points (NAPs). The location of an access device (e.g. a hand held computer having wireless networking capability) can be approximated by the location of the NAP that is serving the access device. Alternatively, the location of an access device can be determined using a device/client-based method. An example of a device-based method involves use of a global positioning system (GPS) receiver. The GPS receiver is attached to the access device to provide GPS data. The GPS data is relayed by the access device to a location system. The location system maps the GPS data to a relevant location.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE DRAWINGS

Disclosed herein are methods and systems for determining an approximation to the location of a user within a geographical area covered by wireless connectivity. The estimated location of the user is based on wireless access point location information, along with geography information, previous historical events data, immediate movement history pertaining to the user, and data contained in requests for information from the user when using a wireless-enabled device.

The methods and systems use a learn-as-you-go approach to location determination. Historical information about movements and location is continuously collected in a history database. The accuracy of an estimate of a location is commensurate with the amount of historical information gathered and processed. The geographical information and historical data are combined in heuristic ways to improve the accuracy of determining the location of a user. The heuristics can be expanded to include other fine tuning methods such as genetic algorithms or pattern matching to improve the accuracy of determining the location.

Figure 1:
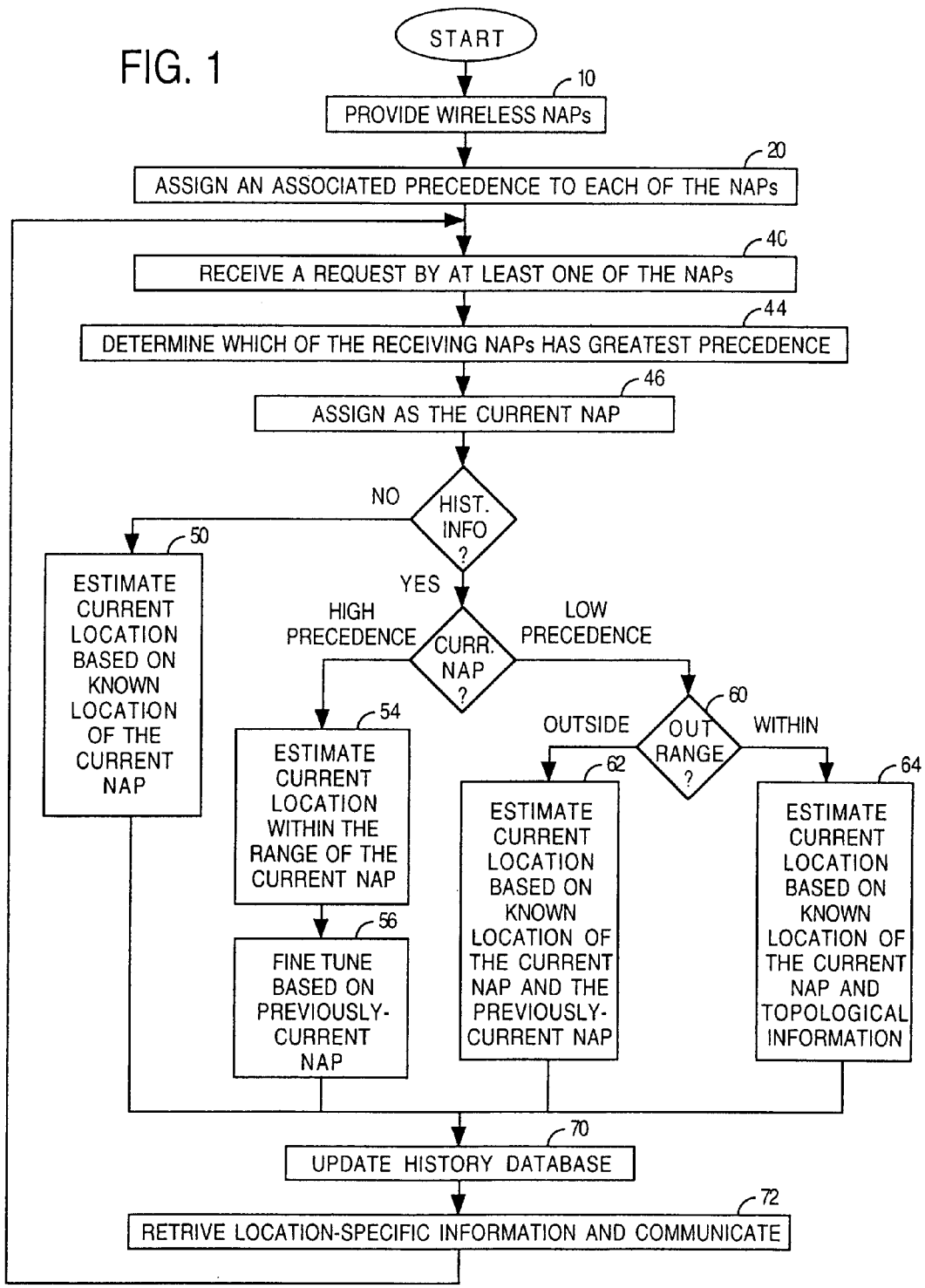
FIG. 1 is a flow chart of an embodiment of a method of location determination.
Figure 2:
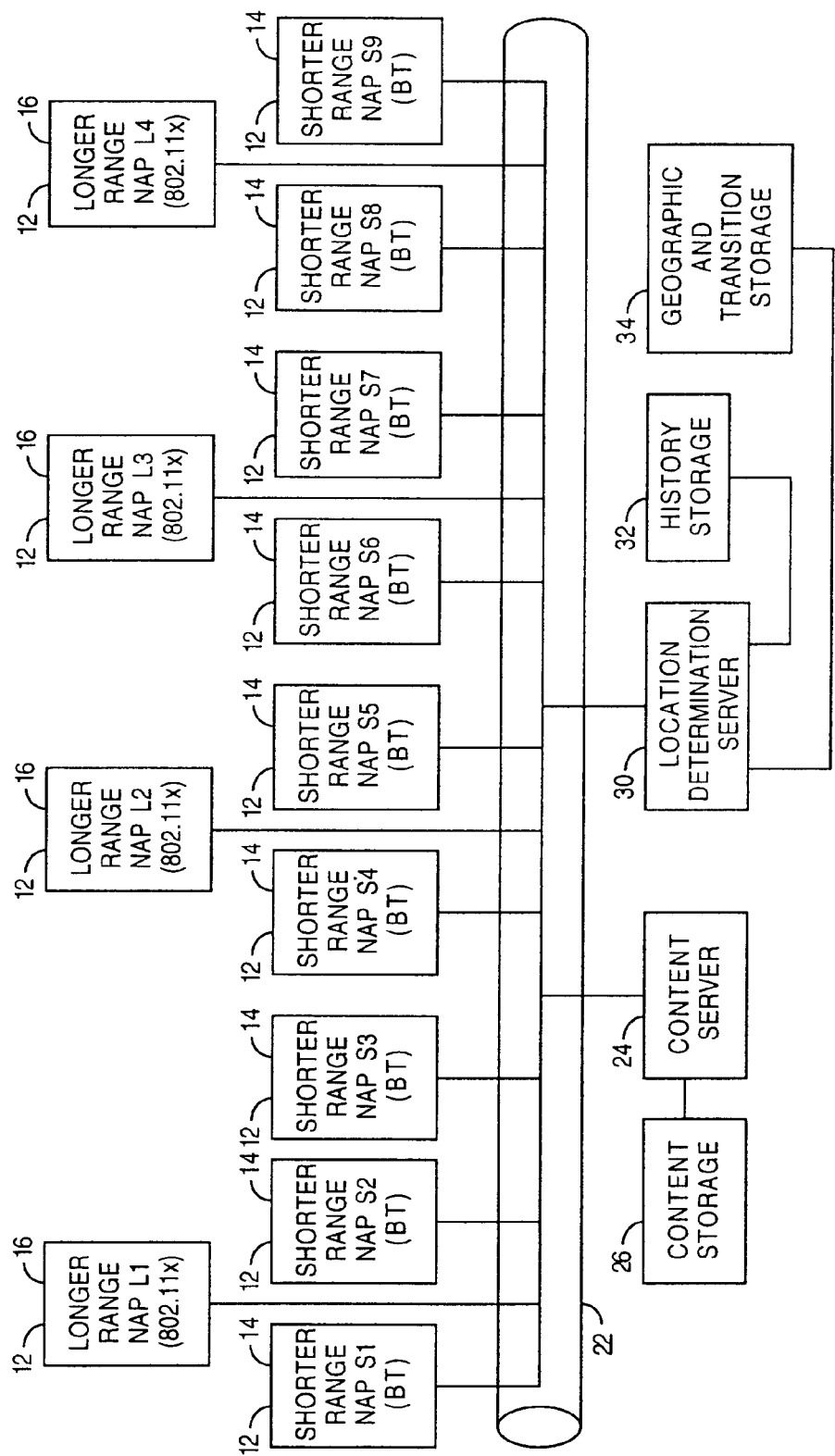
FIG. 2 is a block diagram of an embodiment of a system for location determination.

Embodiments of the present invention are described with reference to FIG. 1, which is a flow chart of an embodiment of a method of location determination, and FIG. 2, which is a block diagram of an embodiment of a system for location determination.

As indicated by block 10, the method comprises providing a collection of wireless network access points (NAPs) 12. Each of the NAPs 12 has a known location used to estimate locations of wireless devices in communication therewith. The NAPs 12 comprise multiple shorter-range NAPs 14 and multiple longer-range NAPs 16. Each of the longer-range NAPs 16 provides a wider coverage range than each of the shorter-range NAPs 14. In one embodiment, each of the longer-range NAPs 16 comprises an IEEE.802.11 NAP, and each of the shorter-range NAPs 14 comprises a Bluetooth NAP. As used herein, 802.11 should be construed as being inclusive of any 802.11-based technology or protocol, including but not limited to 802.11a, 802.11b, 802.11g. In another embodiment, each of the longer-range NAPs 16 comprises a first 802.11 technology (e.g. 802.11b) NAP, and each of the shorter-range NAPs 14 comprises a second 802.11 technology (e.g. 802.11a). It is noted that in general, the present disclosure contemplates that non-802.11 and non-Bluetooth wireless technologies and/or protocols may be employed in the NAPs 12.

Figure 3:
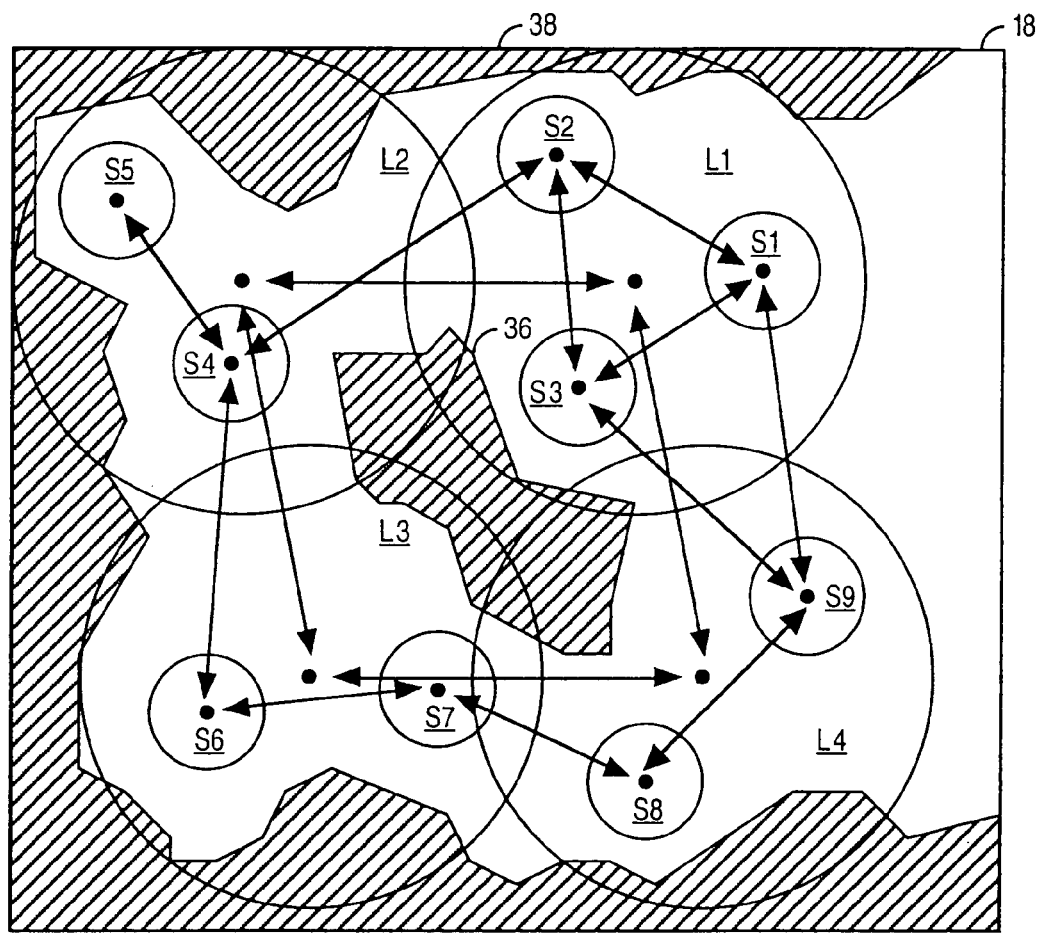
FIG. 3 depicts an example of NAP deployment in a geographical area.

An example of NAP deployment in a geographical area 18 is depicted in FIG. 3. Examples of the geographical area 18 include, but are not limited to, an amusement park, a campus, a downtown area, a park, and any area that users carry a wireless-enabled portable device such as a handheld computer, a personal digital assistant, or a wireless telephone.

In this example, four longer-range NAPs, having ranges depicted by circular areas L1, L2, L3 and L4, are deployed. Nine shorter-range NAPs, having ranges depicted by circular areas S1, S2, S3, S4, S5, S6, S7, S8 and S9, are deployed. Each of the NAPs is located approximately at a center point of its corresponding circular range.

As those having ordinary skill will recognize, the range of each NAP is not necessarily circular in practice. Thus, the scope of this disclosure should not be construed as being limited to circular ranges for each of the NAPs, which are depicted without loss of generality.

The ranges S1, S2 and S3, and their associated shorter-range NAPs, are contained within the range L1. The ranges S4 and S5, and their associated shorter-range NAPs, are contained within the range L2. The ranges S6 and S7, and their associated shorter-range NAPs, are contained within the range L3. The ranges S8 and S9, and their associated shorter-range NAPs, are contained within the range L4.

As indicated by block 20, the method comprises assigning an associated precedence to each of the NAPs 12. Each of the shorter-range NAPs 14 located within a range of one of the longer-range NAPs 16 is assigned a higher precedence than said one of the longer-range NAPs 16. Thus, the shorter-range NAPs associated with the ranges S1, S2 and S3, have a higher precedence than the longer-range NAP associated with the range L1. The shorter-range NAPs associated with the ranges S4 and S5 have a higher precedence than the longer-range NAP associated with the range L2. The shorter-range NAPs associated with the ranges S6 and S7 have a higher precedence than the longer-range NAP associated with the range L3. The shorter-range NAPs associated with the ranges S8 and S9 have a higher precedence than the longer-range NAP associated with the range L4. Each shorter-range NAP has a higher precedence than each longer-range NAP.

Referring back to FIG. 2, the NAPs 12 provide access to a network 22. The network 22 provides access to a content server 24 that provides location-based services and information within the geographical area 18. For example, the content server 24 may provide directions to and/or information about rides and attractions in an amusement park, building information on a campus, store information in a downtown area, information about different restaurants (e.g. menus, dinner specials or other special meal offers), information about entertainment events (e.g. show times, parental ratings), and landmark information in a park.

Content storage 26 hosts both location-sensitive content and general content. The location-sensitive content relates different locations with different associated information. In one embodiment, the content storage 26 relates relevant information for each particular NAP. For example, the relevant information for locations within the range of a particular NAP may indicate what rides in an amusement park are close to the particular NAP. The content server 24 bundles relevant location-sensitive content with general content, both obtained from the content storage 26, once the location of a user has been identified.

An intelligent location determination server 30 in the network 22 uses heuristic methods to deduce or otherwise estimate a location of a user. As described in more detail hereinafter, the location determination server 30 uses the known geographic locations of the NAPs 12, topological information for the geographical area 18, transition data, history data and temporal data to estimate the location of a user. Two types of history data are used: (a) a history of the location of a device within the context of a session, and (b) previous historical data including locations of a device by one or more other users at particular instants in time.

The history data is stored by history database storage 32. The history database storage 32 stores events regarding the movement of users within the geographical area 18. History data is continually collected for the users for statistical analyses. The history data may comprise historical location information for each wireless device. The historical location information may comprise a corresponding sequence of NAPs accessed by each wireless device. The history database storage 32 may be absent historical location information for a wireless device that is initially entering the geographical area 18. Optionally, the historical location information is initialized for each session of a wireless device within the geographical area 18.

The geographical and transition data is stored by a storage 34. The geographical and transition storage 34 contains topological data that is used to rule out potential locations of users within the geographical area 18. For example, FIG. 3 depicts areas 36 and 38 that the user may not be located in the geographical area 18. The area 36 may correspond to a lake in the middle of the geographical area 18. The area 38 may correspond to thick brush around the periphery of the geographical area 18. All of the NAPs 12 are mapped against the topological information of the geographical area 18 in a preparation stage.

The geographical and transition storage 34 also contains transition data representing possible paths that people may walk or otherwise travel within the geographical area 18. The transition data indicates possible paths from one NAP to another NAP, e.g. side walks or walk paths between points. The transition data is used to determine locations as people move from the range of one NAP to another NAP. In one embodiment, the transition data is stored as a transition table.

FIG. 3 illustrates an example of possible paths by two-way arrows. The history database storage 32 can deduce frequently-traveled paths which is used with probabilistic data to determine/predict location.

The content storage 26, history database storage 32, and geographic and transition storage 34 are embodied by computer-readable media having stored computer-readable data stored thereon. Examples of the computer-readable media include, but are not limited to, magnetic media, optical media and electronic media.

The content server 24 and the location determination server 30 are embodied by one or more computer systems. Each computer system has at least one processor which executes acts based on computer program code. The computer program code is stored as computer-readable data on a computer-readable medium.

As indicated by block 40, the method comprises receiving, by at least one of the NAPs 12, a request for information from a wireless device. The request contains an identifier of the wireless device and/or its user, and identifier(s) of the receiving NAP(s).

Examples of the wireless device include, but are not limited to, a handheld computer, a personal digital assistant, or a wireless telephone. Regardless of its specific form, the wireless device has at least one wireless transceiver to communicate with the NAPs 12. The wireless device may comprise a first wireless transceiver to communicate with the shorter-range NAPs 14 and a second wireless transceiver to communicate with the longer-range NAPs 16. The first wireless transceiver may comprise a Bluetooth transceiver, and the second transceiver may comprise an 802.11 transceiver.

For purposes of illustration and example, consider a user who is walking around an amusement park. The user may request directions to and/or information about rides and attractions close to his/her current location. As another example, a user may request directions to or information about restaurants and entertainment events close to his/her current location in a downtown area. As a further example, a user may request information to locate his/her family members or friends with fine granularity within the geographical area 18.

The request is received either by one of the NAPs 12 or by at least two of the NAPs 12. If the request is received by at least two of the NAPs 12, acts of determining which of the at least two of the NAPs 12 has a greatest precedence (block 44) and assigning same as a current NAP (block 46) are performed. If the request is received by only one of the NAPs 12, the receiving one of the NAPs is assigned as the current NAP (block 46), and no act of determining the greatest precedence need be performed (i.e. block 44 may be skipped). In either case, if the request is received by one of the shorter-range NAPs 14, the one of the shorter-range NAPs 14 is assigned as the current NAP by virtue of its higher precedence over any longer-range NAP covering its range. The aforementioned acts, as well as the following location estimation acts, are performed by the location determination server 30.

The location determination server 30 accesses the history database storage 32 to determine if there is a history of location data for the present session of the wireless device. If the history database storage 32 is absent historical location information for the present session of the wireless device, a current location of the wireless device is estimated based on the known location of the current NAP (block 50). In one embodiment, the current location is estimated to be about at a central point within the range of the current NAP if there are no records of previous access points in the session. Preferably, if there is no history for the present session, the history database storage 32 is queried to retrieve areas where other subscribers have been most likely located at the current NAP at about the time stamp. Based on this historical data, a location of highest likelihood or probability within the range of the current NAP at about the time stamp is determined, and the current location is estimated to be this location.

If the history database storage 32 includes historical information for the session of the wireless device, the current location of the wireless device is estimated based on the known location of the current NAP and the known-location of a previously-current NAP for the wireless device. It is noted that by initializing the history database for each session, only a previously-current NAP or location generated within the session is considered to estimate the location of the wireless device.

If the current NAP is a higher precedence access point (e.g. one of the shorter-range NAPs 14), the current location is estimated to be within a range of the current NAP (block 54). If the transition table includes a link between the previously-current NAP and the current NAP exists, the current location is fine-tuned to be in a sector of a range of the current NAP proximate to the known location of the previously-current NAP (block 56). The sector may comprise a quadrant of an approximately circular range proximate to the known location of the previously-current NAP. The estimate of the current location also may be based on the topological information of locations where the wireless device may not be located. The topological information is used to rule out portions of the range of the current NAP.

If the current NAP is a lower precedence access point (e.g. one of the longer-range NAPs 16), an act of determining whether or not the previously-current NAP is located outside the range of the current NAP is performed (block 60). If the previously-current NAP is located outside the range of the current NAP, the current location is estimated based on the known location of the current NAP and the previously-current NAP (block 62). In one embodiment, the current location is estimated to be within the range of the current NAP and slanted or otherwise biased toward the known location of the previously-current NAP.

If the previously-current NAP is located within the range of the current NAP, the current location is estimated based on the known location of the current NAP and the topological information (block 64). The topological information is used to eliminate areas that the user may not be located (e.g. a lake). A central point within the range and acceptable according to the topological information is assigned as the current location.

For any of the aforementioned location estimation acts, the location determination server 30 may employ additional heuristics. For example, the location determination server 30 may evaluate probable paths that a user can take based on statistical and temporal information gathered during the operation of the system, i.e. over multiple sessions of multiple wireless devices. This way, the system can learn the transportation patterns of users in the past. The probability or likelihood of a user/device to be at a particular location can be computed based upon context such as time or day or previously location.

As indicated by block 70, the method comprises updating the history database storage 32 to record the current location. This act may include any one or more of the following: recording the current NAP, recording the known location of the current NAP, recording the estimated current location, recording all NAPs that received the request, recording temporal information, recording transition information (e.g. a sequence of NAPs along a path), and recording a time stamp.

As indicated by block 72, the method comprises retrieving information associated with the estimated current location and communicating the information to the wireless device in response to the request for information. The content server 24 uses the estimated current location determined by the location determination server 30 to access location-sensitive content particular to the current location from the content storage 26. The content server 24 bundles the relevant location-sensitive content with general content once the location of a user has been identified, and communicates same to the wireless device via the network 22 and the current NAP. The bundled content is displayed by the wireless device for view by the user.

In contrast to the present disclosure, if a GPS-based location service is used, GPS information would need to be mapped to area ranges where specific sites of interest may reside. Such an approach is more complex than mapping NAPs to sites of interest.

Figure 4:
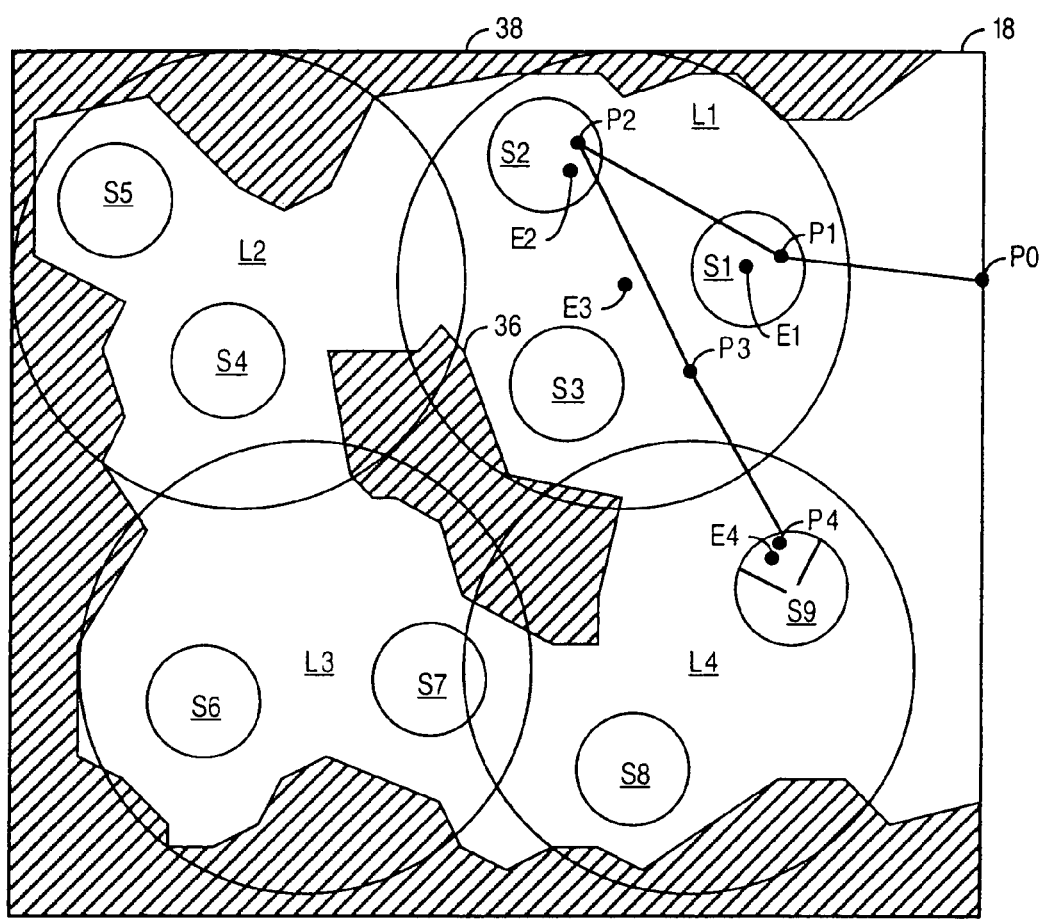
FIG. 4 illustrates an example path for a session of a user in the geographical area.

FIG. 4 illustrates an example path for a session of a user in the geographical area 18. The user walks from point P0 to point P1. At the point P1, the user submits a first request for information using a wireless device. The first request is received by the shorter-range NAP having the range S1 and the longer-range NAP having the range L1. Since the shorter-range NAP has a higher precedence than the longer-range NAP, and since this is the first request for information in the session, an estimated location E1 of the user is determined to be close to a central point E1 of the range S1. Information relevant to the estimated location E1 is communicated to the wireless device based on the first request.

From the point P1, the user walks to point P2. At the point P2, the user submits a second request for information using the wireless device. The second request is received by the shorter-range NAP having the range S2 and the longer-range NAP having the range L1. Since the shorter-range NAP has a higher precedence than the longer-range NAP, the shorter-range NAP having the range S2 is assigned to be the current NAP. Since the last request received for the user was from a NAP outside the range of the current NAP, an estimated location E2 of the user is determined to be within the range S2 and biased toward the range S1. Information relevant to the estimated location E2 is communicated to the wireless device based on the second request.

From the point P2, the user walks to point P3. At the point P3, the user submits a third request for information using the wireless device. The third request is received by only the longer-range NAP having the range L1. Therefore, this NAP is assigned to be the current NAP. Since the last request received for the user was from a NAP within the range of the current NAP, an estimated location E3 of the user is determined to be close to a central portion of the range L1. Information relevant to the estimated location E3 is communicated to the wireless device based on the third request.

From the point P3, the user walks to point P4. At the point P4, the user submits a fourth request for information using the wireless device. The fourth request is received by the shorter-range NAP having the range S9 and the longer-range NAP having the range L4. Since the shorter-range NAP has a higher precedence than the longer-range NAP, the shorter-range NAP having the range S9 is assigned to be the current NAP. Since the current NAP is a high-precedence NAP, an estimated location E4 of the user is determined to be within a quadrant of the range S9 closer to the range L1 of the last request. Information relevant to the estimated location E4 is communicated to the wireless device based on the fourth request.

It is noted that the present invention is not limited to two layers of NAPs, namely shorter-range NAPs and longer-range NAPs. In general, any number of layers of NAPs can be employed. For example, three or more layers of NAPs using three or more NAP technologies and/or frequencies and/or ranges and/or radios may be employed. The herein-disclosed algorithm can be applied under the general multi-layer scenario.

Further, the precedence of NAPs may be determined via additional criteria such as user preferences or business rules. Consider, for example, a geographical area such as an airport where there is more than one wireless local area network (WLAN) operator. The user may obtain good signals from two competing NAPs controlled by two different providers. In that case, additional criteria such as pricing, user preference on quality of service (which may be subjective), or business rules implemented by the provider (e.g. if the user is a subscriber of one provider but not the other) can be used to influence the outcome.

Preferably, historical/temporal data about a wireless device is stored anonymously, i.e. without personally identifiable information about a user. Thus, a user is not tracked per se and his/her privacy is not an issue.

It will be apparent to those skilled in the art that the disclosed invention may be modified in numerous ways and may assume many embodiments other than the preferred form specifically set out and described above. For example, the functionality of the content server 24 and the location determination server 30 may be provided by either a single server or more than two servers. As another example, the data stored by the content storage 26, the history database storage 32, and the geographical and transition information storage 34 may be stored by the same storage system.

Accordingly, it is intended by the appended claims to cover all modifications of the invention which fall within the true spirit and scope of the invention.

The invention claimed is:

1. A method comprising:
   receiving a request at an intelligent location determination server for information from a wireless device, the request for information being associated with at least two network access points (NAPs), where the at least two NAPs are part of a plurality of NAPs each having a known location and a unique identifier, the plurality of NAPs comprising shorter-range NAPs and longer-range NAPs;
   determining at the intelligent location determination server which of the at least two NAPs has a greater precedence and assigning the NAP having greater precedence as a current NAP; and
   determining at the intelligent location determination server an estimated current location of the wireless device based on the known location of the current NAP and a known location of a previously-current NAP for the wireless device from a history database, wherein the history database tracks a sequence of NAPs accessed by the wireless device;
   wherein the estimated current location is biased toward the previously-current NAP when the current NAP is one of the longer-range NAPs and the previously-current NAP is located outside of a range of the current NAP; and
   wherein the estimated current location is within the range of the current NAP and not within a range of the previously-current NAP when the current NAP is one of the longer-range NAPs and the previously-current NAP is located within the range of the current NAP.

2. The method of claim 1 wherein each of the shorter-range NAPs located within a range of one of the longer-range NAPs is assigned a higher precedence than the one of the longer-range NAPs.

3. The method of claim 1 wherein each shorter-range NAP has a higher precedence than each longer-range NAP.

4. The method of claim 1, further comprising:
   updating the history database with the estimated current location.

5. The method of claim 1, further comprising:
   updating the history database with the current NAP.

6. The method of claim 1, further comprising:
   updating the history database with NAP-to-NAP transition information.

7. The method of claim 1, further comprising:
   transmitting the estimated current location to the wireless device.

8. A non-transitory computer-readable storage medium for an intelligent location determination server, the computer-readable storage medium comprising a set of instructions for determining a location based on historical data, the set of instructions to direct a processor to perform acts of:
   receiving a request for information from a wireless device, the request for information being associated with at least two network access points (NAPs), where the at least two NAPs are part of a plurality of NAPs each having a known location and a unique identifier, the plurality of NAPs comprising shorter-range NAPs and longer-range NAPs;
   determining which of the at least two NAPs has a greater precedence and assigning the same as a current NAP; and
   determining an estimated current location of the wireless device based on the known location of the current NAP and a known location of a previously-current NAP for the wireless device from a history database, wherein the history database tracks a sequence of NAPs accessed by the wireless device;
   wherein the estimated current location is biased toward the previously-current NAP when the current NAP is one of the longer-range NAPs and the previously-current NAP is located outside of a range of the current NAP; and
   wherein the estimated current location is within the range of the current NAP and not within a range of the previously-current NAP when the current NAP is one of the longer-range NAPs and the previously-current NAP is located within the range of the current NAP.

9. The computer-readable storage medium of claim 8, wherein each of the shorter-range NAPs located within a range of one of the longer-range NAPs is assigned a higher precedence than the one of the longer-range NAPs.

10. The computer-readable storage medium of claim 8, wherein each shorter-range NAP has a higher precedence than each longer-range NAP.

11. The computer-readable storage medium of claim 8, further comprising a set of instructions to direct the processor to perform the act of:
    updating the history database with the estimated current location.

12. The computer-readable storage medium of claim 8, further comprising a set of instructions to direct the processor to perform the act of:
    updating the history database with the current NAP.

13. The computer-readable storage medium of claim 8, further comprising a set of instructions to direct the processor to perform the act of:

updating the history database with NAP-to-NAP transition information.

14. The computer-readable storage medium of claim 8, further comprising a set of instructions to direct the processor to perform the act of:
transmitting the estimated current location to the wireless device.

15. A system for determining a location based on historical data, the system comprising:
a location determination component operative to receive a request for information from a wireless device, the request for information being associated with at least two network access points (NAPs), to determine which of the at least two NAPs has a greater precedence, and to determine an estimated current location of the wireless device based on a known location of a current NAP and a known location of a previously-current NAP for the wireless device from a history database;
wherein that at least two NAPs are part of a plurality of NAPs each having a known location and a unique identifier, the plurality of NAPs comprising shorter-range NAPs and longer-range NAPs;
wherein the location determination component biases the estimated current location toward the previously-current NAP when the current NAP is one of the longer-range NAPs and the previously-current NAP is located outside of a range of the current NAP; and
wherein the estimated current location is within a range of the current NAP and not within a range of the previously-current NAP when the current NAP is one of the longer-range NAPs and the previously-current NAP is located within the range of the current NAP.

16. The system of claim 15, wherein each of the shorter-range NAPs located within a range of one of the longer-range NAPs is assigned a higher precedence than the one of the longer-range NAPs.

17. The system of claim 15, wherein each shorter-range NAP has a higher precedence than each longer-range NAP.

18. The system of claim 15, wherein the location determination component is further operative to update the history database with the estimated current location.

19. The system of claim 15, wherein the location determination component is further operative to update the history database with the current NAP.

20. The system of claim 15, wherein the location determination component is further operative to transmit the estimated current location to the wireless device.

* * * * *